United States Patent
Binns et al.

(10) Patent No.: US 10,621,587 B2
(45) Date of Patent: Apr. 14, 2020

(54) FRAUD REMEDIATION TOOL

(71) Applicant: BANK OF AMERICA CORPORATION, Charlotte, NC (US)

(72) Inventors: Donald Francis Binns, Charlotte, NC (US); Michelle Lynne Baker, Modesto, CA (US); Michael Thomas Timoney, Denver, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 499 days.

(21) Appl. No.: 15/483,920

(22) Filed: Apr. 10, 2017

(65) Prior Publication Data
US 2018/0293582 A1 Oct. 11, 2018

(51) Int. Cl.
| G06Q 40/00 | (2012.01) |
| G06Q 20/40 | (2012.01) |
| G06Q 30/00 | (2012.01) |
| G06Q 20/32 | (2012.01) |
| G06Q 20/42 | (2012.01) |
| G06Q 20/20 | (2012.01) |

(52) U.S. Cl.
CPC ......... G06Q 20/4016 (2013.01); G06Q 20/20 (2013.01); G06Q 20/3224 (2013.01); G06Q 20/405 (2013.01); G06Q 20/425 (2013.01); G06Q 30/0185 (2013.01)

(58) Field of Classification Search
CPC .................. G06Q 20/4016; G06Q 30/0185
See application file for complete search history.

(56) References Cited

U.S. PATENT DOCUMENTS

| 7,708,190 B2 * | 5/2010 | Brandt ................. G06Q 20/425 |
| | | 235/379 |
| 8,447,674 B2 | 5/2013 | Choudhuri et al. |
| 8,589,298 B2 | 11/2013 | Choudhuri et al. |

(Continued)

FOREIGN PATENT DOCUMENTS

| CA | 2811197 A1 * | 5/2013 | |
| JP | 2007521739 | * 8/2007 | ........ H04W 12/1206 |
| JP | 2018132835 | * 8/2018 | ............. G06Q 20/24 |

OTHER PUBLICATIONS

Anonymous, "System and Method for detecting online fraud using IP address, email and other order variables" 1p.com No. IPCOM000185458D (Year: 2009).*

*Primary Examiner* — Alexander G Kalinowski
*Assistant Examiner* — William B. Bunker
(74) *Attorney, Agent, or Firm* — Michael A. Springs

(57) ABSTRACT

A fraud remediation tool includes a memory, a network interface, a fraud detection engine, and a clearance engine. The memory stores a plurality of fraud detection rules. The network interface receives a first transaction and a second transaction. The fraud detection engine determines, based on the plurality of fraud detection rules, that the transaction is fraudulent. In response to the determination that the transaction is fraudulent, the fraud detection engine stops the transaction, blocks use of the first card, and communicates a first message to the user indicating that the card is blocked. The clearance engine receives, from the user, a response to the message indicating that the transaction is not fraudulent. Based on the response, the clearance engine releases the block on the second card and the block on the first card.

21 Claims, 3 Drawing Sheets

(56) References Cited

U.S. PATENT DOCUMENTS

| | | | |
|---|---|---|---|
| 8,606,712 B2 | 12/2013 | Choudhuri et al. | |
| 8,666,894 B1 * | 3/2014 | Buch | G06Q 20/10 455/10 |
| 8,690,054 B1 * | 4/2014 | Cummins | G06Q 30/06 235/379 |
| 2005/0199714 A1 * | 9/2005 | Brandt | G06Q 20/40 235/382.5 |
| 2010/0063895 A1 * | 3/2010 | Dominguez | G06Q 20/02 705/26.1 |
| 2010/0228670 A1 * | 9/2010 | Patterson | G06Q 20/04 705/44 |
| 2011/0302083 A1 * | 12/2011 | Bhinder | G06Q 20/32 705/44 |
| 2015/0371233 A1 * | 12/2015 | Simakov | G06Q 20/3572 705/44 |
| 2017/0011389 A1 * | 1/2017 | McCandless | G06Q 20/36 |
| 2017/0076289 A1 * | 3/2017 | Brundage | G06Q 20/409 |
| 2017/0200158 A1 * | 7/2017 | Honey | G06Q 20/40 |
| 2017/0357977 A1 * | 12/2017 | Pitz | G06Q 20/202 |

\* cited by examiner

ND TOOL

TECHNICAL FIELD

This disclosure relates generally to transaction security, specifically fraud detection and remediation.

BACKGROUND

When fraud is detected in a commercial transaction, the transaction and subsequent transactions may be declined, until a response authorizing the transaction is received from the user.

SUMMARY OF THE DISCLOSURE

According to an embodiment, a fraud remediation tool includes a memory, a network interface, a fraud detection engine, and a clearance engine. The memory stores a plurality of fraud detection rules. The network interface receives a first transaction and a second transaction. The first transaction involves a first card of a user, and the second transaction involves a second card of a user. The second transaction occurs after the first transaction. The fraud detection engine determines, based on the plurality of fraud detection rules, that the first transaction is fraudulent. In response to the determination that the first transaction is fraudulent, the fraud detection engine stops the first transaction, blocks use of the first card, and communicates a first message to the user indicating that the first card is blocked. The fraud detection determines, based on the plurality of fraud detection rules, that the second transaction is fraudulent. In response to the determination that the second transaction is fraudulent, the fraud detection engine stops the second transaction, blocks use of the second card, and communicates a second message to the user indicating that the second card is blocked. The clearance engine receives, from the user, a response to the second message indicating that the second transaction is not fraudulent. Based on the response, the clearance engine releases the block on the second card and the block on the first card.

According to another embodiment, a method includes storing a plurality of fraud detection rules. The method also includes receiving a first transaction involving a first card of a user, and receiving a second transaction involving a second card of a user, the second transaction occurring after the first transaction. The method further includes determining, based on the plurality of fraud detection rules, that the first transaction is fraudulent. In response to the determination that the first transaction is fraudulent, the method includes stopping the first transaction, blocking use of the first card, and communicating a first message to the user indicating that the first card is blocked. The method also includes determining, based on the plurality of fraud detection rules, that the second transaction is fraudulent. In response to the determination that the second transaction is fraudulent, the method includes stopping the second transaction, blocking use of the second card, and communicating a second message to the user indicating the second card is blocked. The method further includes receiving, from the user, a response to the second message indicating that the second transaction is not fraudulent. Based on the response, the method includes releasing the block on the second card and the block on the first card.

According to yet another embodiment, a system includes a device and a fraud remediation tool. The device receives a first transaction involving a first card of a user, and receives a second transaction involving a second card of a user. The second transaction occurs after the first transaction. The fraud remediation tool stores a plurality of fraud detection rules. The fraud remediation tool receives the first transaction and the second transaction from the device. The fraud remediation tool further determines, based on the plurality of fraud detection rules, that the first transaction is fraudulent. In response to the determination that the first transaction is fraudulent, the fraud remediation tool: stops the first transaction, blocks use of the first card, and communicates a first message to the user indicating that the first card is blocked. The fraud remediation tool also determines, based on the plurality of fraud detection rules, that the second transaction is fraudulent. In response to the determination that the second transaction is fraudulent, the fraud remediation tool: stops the second transaction, blocks use of the second card, and communicates a second message to the user indicating that the second card is blocked. The fraud remediation tool further receives, from the user, a response to the second message indicating that the second transaction is not fraudulent. Based on the response, release the block on the second card and the block on the first card.

Certain embodiments provide one or more technical advantages. For example, an embodiment clears all cards attempted at a merchant at once, instead of clearing only the most recently used card. As another example, embodiments connect card platforms of a user, so that different types of cards may be cleared at once if placed on holds due to fraud detection. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
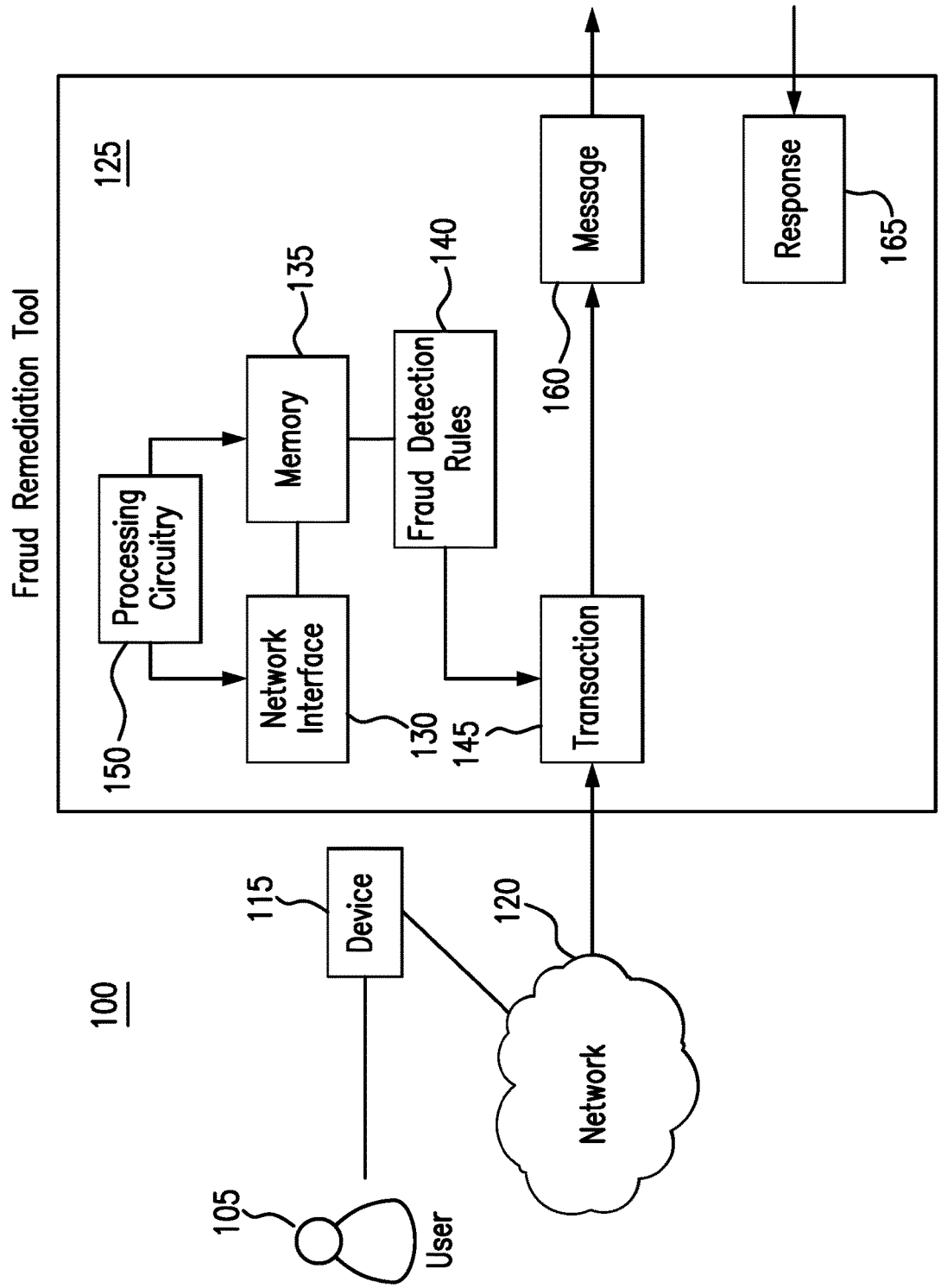
FIG. 1 illustrates a system for fraud remediation.
Figure 2:
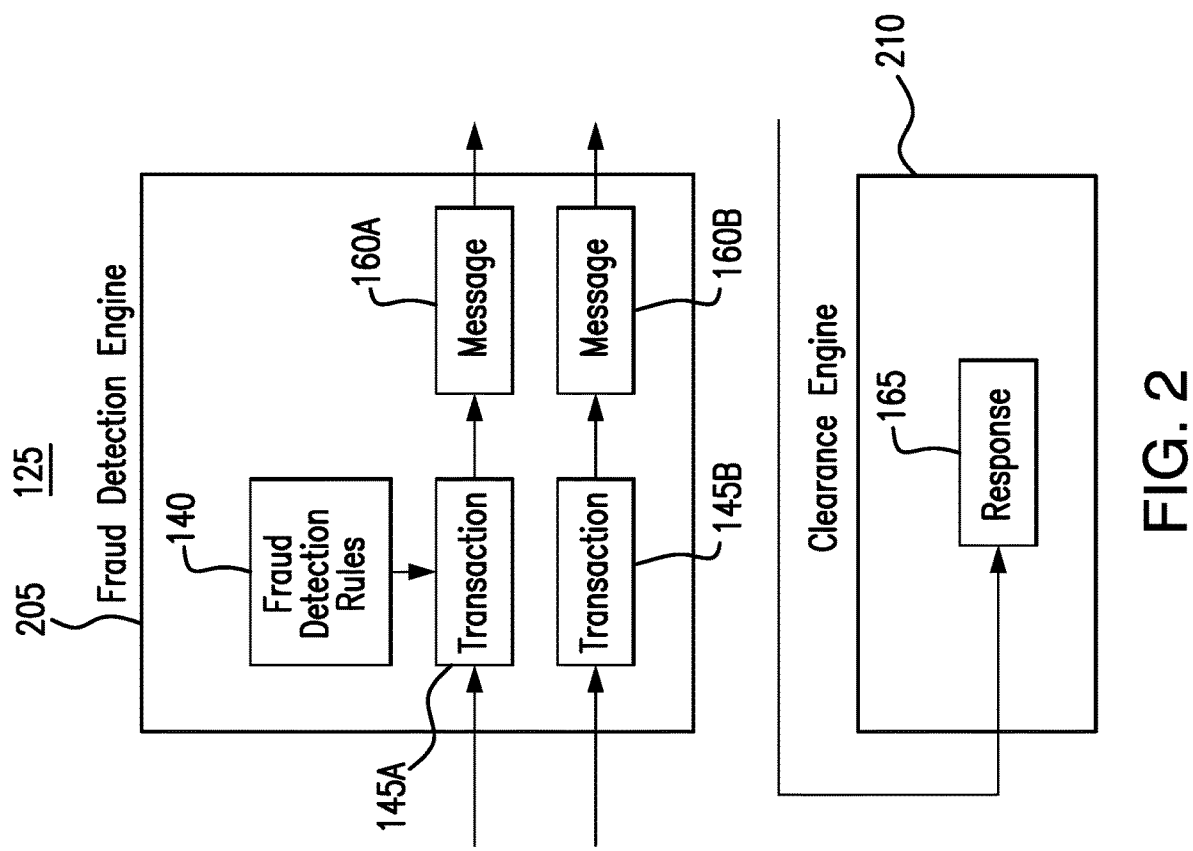
FIG. 2 illustrates the fraud remediation tool of the system of FIG. 1.
Figure 3:
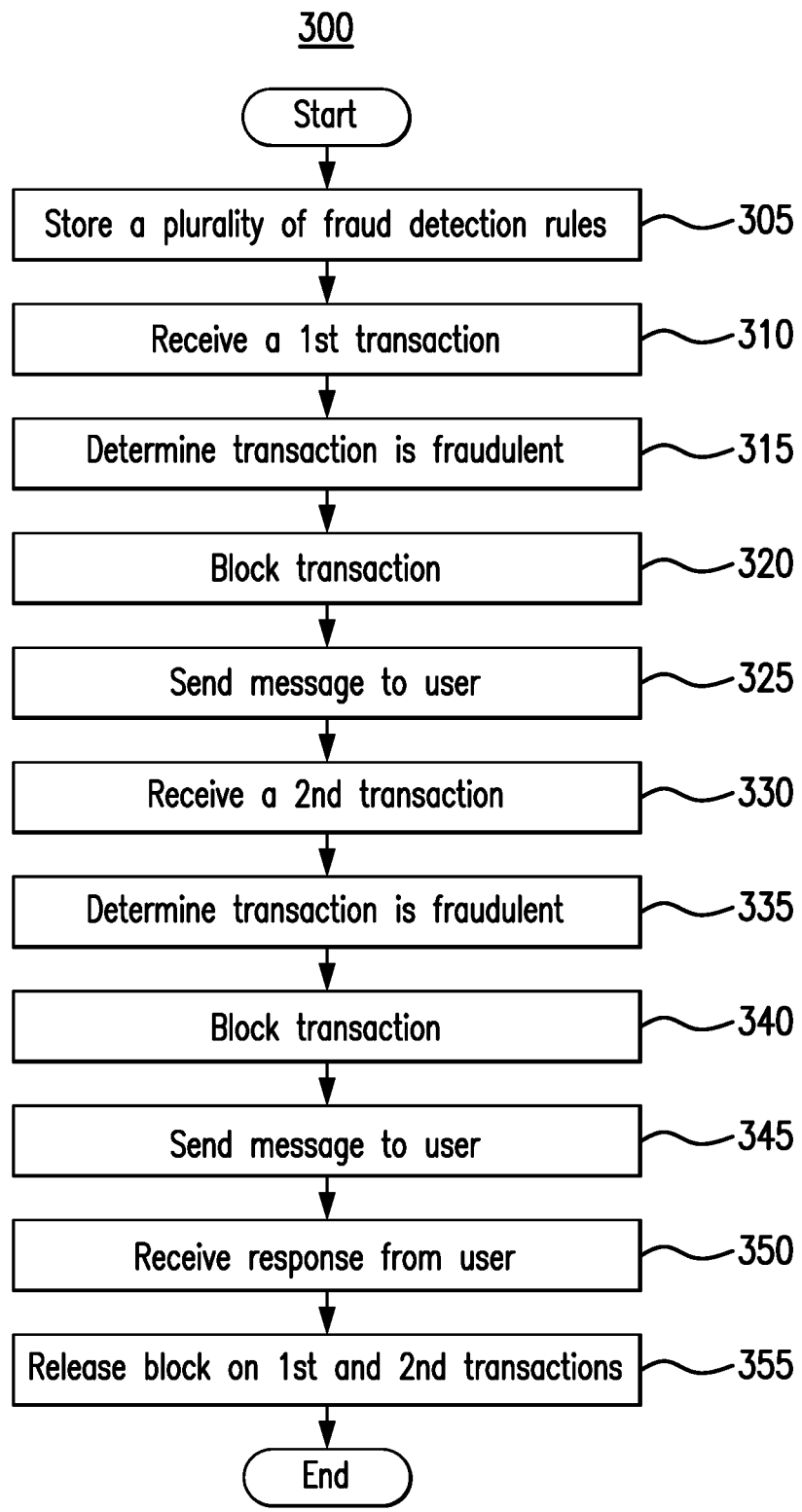
FIG. 3 is a flowchart illustrating a method for detecting and remedying fraud using the system of FIG. 1.

Embodiments of the present disclosure and its advantages are best understood by referring to FIGS. 1 through 3 of the drawings, like numerals being used for like and corresponding parts of the various drawings.

A user attempting a transaction may have that transaction declined if potential fraud is detected by a fraud detection system. For example, a user may attempt to make a purchase with a credit card when potential fraud is detected. Usually, the transaction is blocked and the user is sent a fraud alert message. When blocked, the user can no longer use the credit card to make purchases. The user can respond to the fraud alert message to release the block and proceed with the transaction.

However, conventional fraud detection systems suffer from an inherent problem related to releasing blocks. In many instances, users often have multiple cards that can be used for a transaction. After a first card is blocked, the user may attempt to initiate the transaction again with a different card instead of responding to a fraud alert message to release the block on the first card. As a result, the second card may also get blocked for potential fraud and a second fraud alert message may be sent to the user. This process may continue for multiple cards and the user may receive multiple fraud alert messages (e.g., at least one alert message per blocked card). When the user responds to the chain of fraud alert messages, a fraud system may not know to which alert message the user is responding. As a result, the fraud system may release the block on only one card (e.g., the most recently blocked card), and the user may have no way to release the block on other cards.

This disclosure contemplates an unconventional fraud remediation tool that can release blocks on multiple cards in response to one response to a fraud alert message. Generally, the fraud remediation tool applies a particular ruleset to detect fraud on multiple cards, and then it clears holds on all cards of a user upon a response to a fraud alert message authorizing at least one of the cards. In some embodiments, a separate message thread is associated with each fraud notification. The separate message thread allows the user to respond to separate fraud alert notifications individually. The system can therefore clear all appropriate holds, rather than only clearing the card associated with the most recent fraud event. In some embodiments, the transaction is placed in a temporary hold state without immediately declining the transaction. The hold state provides the user an opportunity to authorize the transaction so that the user does not have to reinitiate the transaction. While on hold, the user may be notified by a fraud alert message that the transaction has been flagged as fraudulent. The user can respond to the message to remove the block and allow the transaction to proceed. As a result, the user does not have to separately clear holds placed on previously attempted or related cards.

In this manner, this unconventional fraud remediation tool provides several technical advantages over conventional fraud detection systems. For example, the fraud remediation tool allows users to release holds on multiple blocked cards whereas conventional fraud detection systems allow a user to release a hold on only one card. As another example, the fraud remediation tool improves the operation of the underlying computer hardware of the fraud detection system by removing holds on multiple cards that would otherwise be unremovable in a conventional system. In this manner, the underlying computer hardware is not tasked with storing and processing holds unnecessarily, thereby reducing the computational resources (e.g., processor and memory resources) used by the system. The fraud remediation tool will be described generally using FIG. 1. The fraud remediation tool will be described more specifically using FIGS. 2 and 3.

FIG. 1 illustrates a system 100 for fraud remediation. As illustrated in FIG. 1, system 100 includes device 115, network 120, and fraud remediation tool 125. In certain embodiments, system 100 applies fraud detection rules 140 to detect fraud on an account of user 105. For example, system 100 may apply fraud detection rules 140 on a transaction 145 (e.g., a purchase using a credit card of user 105) to determine that transaction 145 may be fraudulent. System 100 may then place a block for that transaction 145 (e.g., by rejecting transaction 145 and preventing subsequent use of the credit card of user 105). System 100 may then communicate message 160 to alert user 105 of the detected fraud. This process can repeat if user 105 decides to attempt transaction 145 again with a different card. As a result, multiple cards may end up blocked. System 100 performs the unconventional step of clearing holds placed on multiple cards of a user 105 upon a response 165 to one message 160 authorizing at least one of the cards. In this manner, user 105 is provided a way to release holds and/or blocks on multiple cards.

Users 105 may use one or more cards to make purchases via device 115. This disclosure further contemplates device 115 being a personal device of user 105 that contains one or more cards, such that users 105 can use device 115 to make purchases. This disclosure also contemplates device 115 being a merchant terminal that accepts cards of user 105 for making purchases. Device 115 may be any appropriate device for communicating with components of system 100 over network 120 to facilitate a transaction. For example, device 115 may be a merchant point of sale, a cash register, a telephone, a mobile phone, a computer, a laptop, a tablet and/or an automated assistant. Device 115 may be a computer, a laptop, a wireless or cellular telephone, an electronic notebook, a digital assistant, a tablet, or any other device capable of receiving, processing, storing, and/or communicating information with other components of system 100. Device 115 may also include a user interface such as a display, a microphone, keypad or other appropriate terminal equipment usable by user 105. In some embodiments, an application executed by device 115 may perform the functions described herein. A card as described herein may be any instrument to initiate a commercial transaction. For example, user 105 may use device 115 to make purchases using a credit card, debit card, payment application on a phone, tablet, or mobile device, or other payment instrument.

Network 120 facilitates communication between and amongst the various components of system 100. This disclosure contemplates network 120 being any suitable network operable to facilitate communication between the components of system 100. Network 120 may include any interconnecting system capable of transmitting audio video signals data, messages, or any combination of the preceding. Network 120 may include all or a portion of a public switched telephone network (PSTN), a public or private data network, a local area network (LAN), a metropolitan area network (MAN), a wide area network (WAN), a local, regional or global communication or computer network such as the internet, a wireline, or a wireless network, an enterprise intranet or any other suitable communication link including combinations thereof operable to facilitate communication between the components. In certain embodiments, user 105 may attempt a transaction 145 with card at device 115, and the transaction 145 may be declined. For example, the transaction 145 may be declined if fraud is detected. In some instances, the transaction 145 may be declined and the user may be sent a message 160. When declined, the user can no longer use the card for the transaction 145. In some instances after the card is blocked, the user 105 may attempt to initiate the transaction 145 again with a different card instead of responding to the message 160. As a result, the second card may also be blocked for potential fraud and a second message 160 may be sent to the user 105. When the system 100 receives a response to the message from user 105, it may not know to which message 160 corresponding to which card the user 105 is responding. As a result, the fraud remediation tool 125 may release the block on only one card and the user 105 may have no way to release the block on the other cards.

Fraud remediation tool 125 may address issues faced by system 100 when a user 105 has multiple cards blocked. Fraud remediation tool 125 may clear all blocks on cards with one response 165 from the user. As illustrated in FIG. 1, fraud remediation tool 125 includes network interface 130, memory 135, and processing circuitry 150. This disclosure contemplates network interface 130, memory 135, and processing circuitry 150 being communicatively coupled together and configured to perform any of the functions of fraud remediation tool 125 disclosed herein.

Network interface 130 represents any suitable device operable to receive information from network 120, transmit information through network 120, perform processing of information, communicate with other devices, or any combination of the preceding. For example, network interface 130 may receive user interactions from device 115. As another example, network interface 130 may communicate messages to device 115. Network interface 130 represents any port or connection, real or virtual, including any suitable hardware and/or software, including protocol conversion and data processing capabilities, to communicate through a LAN, WAN, or other communication system that allows processing circuitry 150 to exchange information with device 115, network 120, or other components of system 100.

Memory 135 may store, either permanently or temporarily, data, operational software, or other information for processing circuitry 150. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processing circuitry 150 to perform one or more of the functions described herein.

Processing circuitry 150 is any electronic circuitry, including, but not limited to microprocessors, application specific integrated circuits (ASIC), application specific instruction set processor (ASIP), and/or state machines, that communicatively couples to memory 135 and controls the operation of fraud remediation tool 125. Processing circuitry 150 may be 8-bit, 16-bit, 32-bit, 64-bit or of any other suitable architecture. Processing circuitry 150 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processing circuitry 150 may include other hardware and software that operates to control and process information. Processing circuitry 150 executes software stored on memory to perform any of the functions described herein. Processing circuitry 150 controls the operation and administration of fraud remediation tool 125 by processing information received from network 120, device(s) 115, and memory 135. Processing circuitry 150 may be a programmable logic device, a microcontroller, a microprocessor, any suitable processing device, or any suitable combination of the preceding. Processing circuitry 150 is not limited to a single processing device and may encompass multiple processing devices.

Fraud remediation tool 125 receives a transaction 145 from network 120. The transaction 145 may include a payment, a payment discount, a reward program, or other commercial exchange. This disclosure contemplates a transaction 145 encompassing any communication from user 105 at device 115. In response to receiving a transaction 145, fraud remediation tool 125 applies fraud detection rules 140 from memory 135. Fraud detection rules 140 may encompass, for example, rules that a transaction not exceed a certain amount, not be made within a distance of a location, or not exceed a number of repetitive purchases for the same amount at a same location. This disclosure contemplates fraud detection rules 140 encompassing any set of criteria to detect fraud. As a result of applying fraud detection rules 140 to transaction 145, fraud remediation tool 125 determines whether transaction 145 is fraudulent.

In response to detecting fraud, fraud remediation tool 125 applies a block (also referred to as a hold). A block may include, for example, putting the transaction 145 in a temporary hold state, declining the transaction 145, and/or otherwise preventing transaction 145 from being completed at device 115. Furthermore, the block prevents user 105 from being able to further use the card used to conduct the fraudulent transaction.

In response to applying block to transaction 145, fraud remediation tool 125 sends message 160 to user 105. For example, message 160 can indicate to user 105 that a block has been applied to a card and that fraud has been detected. As an example and not by way of limitation, message 160 may include an SMS, a text message, an email, or other alert to user 105. Message 160 can be in many formats allowing for a response 165 from user 105. For example, message 160 can be in yes or no (or y/n) format or message 160 can include multiple choices. Message 160 can have other features, for example, requiring user 105 to confirm identity or ask other security questions of user 105.

Fraud remediation tool 125 receives response 165 from user 105 to message 160. Response 165 can indicate to fraud remediation tool that transaction 145 at device 115 is not fraudulent, and/or is otherwise authorized by user 105. As an example and not by way of limitation, response 165 may include an SMS, a text message, an email, or other communication from user 105. For example, response 165 can be in the form of yes/no, y/n, a selection of a choice of a multiple choice, or narrative response. As a result of receiving response 165, fraud remediation tool 125 releases the block applied to the card. As a result of fraud remediation tool 125 releasing the block applied to the card, user 105 can complete transaction 145 at device 115.

In some embodiments, system 100 depicted in FIG. 1 provides several technical advantages over conventional fraud detection systems. For example, fraud remediation tool 125 allows users 105 to release holds on multiple blocked cards, whereas conventional fraud detection systems allow a user to release a hold on only one card. As another example, fraud remediation tool 125 improves the operation of the underlying computer hardware of the fraud detection system by removing holds on multiple cards that would otherwise be unremovable in a conventional system. In this manner, the underlying computer hardware is not tasked with storing and processing holds unnecessarily, thereby reducing the computational resources (e.g., processor and memory resources) used by the system.

Modifications, additions or omissions may be made to system 100 depicted in FIG. 1. System 100 may include more, fewer or other components. Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

FIG. 2 illustrates fraud remediation tool 125 for fraud remediation. As illustrated in FIG. 2, fraud remediation tool includes fraud detection engine 205 and clearance engine 210. This disclosure contemplates detection engine 205 and clearance engine 210 being implemented in network interface 130, memory 135, and processing circuitry 150 of fraud remediation tool 125. In certain embodiments, fraud remediation tool 125 clears holds placed on cards of a user 105 upon a response 165 to a message 160 authorizing at least one of the cards. As a result, a fraud remediation tool 125 can release blocks on multiple cards in response to one response 165 from user 105 to a message 160.

Fraud detection engine 205 receives one or more transactions 145 from network 120. In the illustrated example of FIG. 2, fraud detection engine 205 receives a first transaction 145A and a second transaction 145B. For example, first transaction 145A could involve a first card of user 105 at device 115, and second transaction 145B could involve a second card of user 105 at device 115. Both first transaction 145A and second transaction 145B may be received from device 115. This disclosure contemplates fraud detection engine 205 receiving any number of transactions 145 from network 120. The transaction 145 may include a payment, a payment discount, a reward program, or other commercial exchange. An example algorithm for fraud detection engine 205 is as follows: wait for transaction information; receive first transaction 145A; receive second transaction 145B.

This disclosure contemplates a transaction 145 encompassing any communication from user 105 at device 115. In response to receiving a transaction 145, fraud detection engine 205 applies fraud detection rules 140. Fraud detection rules 140 may encompass, for example, rules that a transaction not exceed a certain amount, not be made within a distance of a location, or not exceed a number of repetitive purchases for the same amount at a same location. This disclosure contemplates fraud detection rules 140 encompassing any set of criteria to detect fraud. Fraud detection engine 205 may apply fraud detection rules 140 to transaction 145 to determine whether transaction 145 is fraudulent.

In response to detecting fraud, fraud detection engine 205 applies a block (also referred to as a hold) to card. A block may include, for example, putting the transaction 145 in a temporary hold state, declining the transaction 145, and/or otherwise preventing transaction 145 from being completed at device 115. In certain embodiments, block prevents user 105 from being able to further use the blocked card. An example algorithm for fraud detection engine 205 is as follows: apply one or more fraud detection rules to a transaction 145; determine whether the transaction 145 is fraudulent based on the results of applying the one or more fraud detection rules; if the transaction 145 is fraudulent, decline the transaction 145 and prevent subsequent use of a card used to conduct transaction 145.

In response to applying block to transaction 145, fraud detection engine 205 sends one or more messages 160 to user 105. For example, message 160 can indicate to user 105 that a block has been applied to card and that fraud has been detected. In FIG. 2, fraud detection engine 205 sends a first message 160A and a second message 160B. As an example and not by way of limitation, message 160 may include an SMS, a text message, an email, or other alert to user 105. Message 160 can be in many formats allowing for a response 165 from user 105. For example, message 160 can be in yes or no (or y/n) format or message 160 can include multiple choices. Message 160 can have other features, for example, requiring user 105 to confirm identity or ask other security questions of user 105. An example algorithm for fraud detection engine 205 is as follows: determine subsequent use of the card used to conduct transaction 145 is prevented; if subsequent use of the card to conduct transaction 145 is prevented, generate message 160, and send message 160 to user 105.

Clearance engine 210 receives one or more responses 165 from user 105 to one or more messages 160. In the illustrated example FIG. 2, clearance engine receives one response 165 from user 105 to messages 160A and 160B. Response 165 can indicate to fraud remediation tool that transaction 145 at device 115 is not fraudulent, and/or is otherwise authorized by user 105. As an example and not by way of limitation, response 165 may include an SMS, a text message, an email, or other communication from user 105. For example, response 165 can be in the form of yes/no, y/n, a selection of a choice of a multiple choice, or narrative response. As a result of receiving response 165, clearance engine 210 releases the block applied by fraud detection engine 205 to card. For example, as a result of receiving response 165, clearance engine 210 can release the blocks applied by fraud detection engine 205 to the first card of user 105 for the first transaction 145A, and also release the block applied by fraud detection engine 205 to the second card of user 105 for the first transaction 145B. As a result of clearance engine 210 releasing the block applied to card, user 105 can complete transaction 145 at device 115. An example algorithm for clearance engine 210 is as follows: wait for response 165; receive response 165; determine, based on response 165, whether subsequent use of the card to conduct transaction 145A should be permitted; permit use of the card to conduct transaction 145A based on response 165; determine, based on response 165, whether subsequent use of the card to conduct transaction 145B should be permitted; permit use of the card to conduct transaction 145B based on response 165.

In some embodiments, message 160 may include one or more choices for user 105 to select. For example, message 160 may include a first choice and a second choice. This disclosure contemplates the first choice and the second choice to trigger different actions by the clearance engine 210. As an example and not by way of limitation, as a result of receiving a first choice response, clearance engine 210 may release a block on a first transaction 145A but not a second transaction 145B. As another example, as a result of receiving a first choice response, clearance engine 210 may not release a block on any transaction 145. As another example, as a result of receiving a first choice response, clearance engine 210 may release a block on all transactions 145.

In some embodiments, user 105 may select either a first choice or a second choice to include in response 165. Clearance engine 210 may receive response 165 to message 160 from user 105 in the form of a first choice or a second choice. For example, user 105 may select the first choice from message 160. User 105 may send response 165 with the first choice to the fraud remediation tool 125. Clearance engine 210 may receive the first choice response. As a result of receiving the first choice response, clearance engine 210 may release the block on the second card but not the first card. As another example, in some embodiments, user 105 may select the second choice from message 160. User 105 may send response 165 with the second choice to the fraud remediation tool 125. Clearance engine 210 may receive the second choice response. As a result of receiving the second choice response, clearance engine 210 may release the block on the second card but not the first card.

In some embodiments, fraud remediation tool 125 may further include a user profile engine. This disclosure contemplates user profile engine being implemented in network interface 130, memory 135, and processing circuitry 150 of fraud remediation tool 125. The user profile engine may store user preferences. As an example, user preferences may include locations, transactions amounts, message formats, distances, amounts, devices, or other criteria or preferences set by user 105. This disclosure contemplates user preferences including any criteria that may be applied by fraud detection engine 205 in addition to fraud detection rules 140 to detect fraud. This disclosure further contemplates user preferences including other preferences related to the format of message 160 or response 165. For example, fraud detection engine 205 can apply user preferences to transaction 145 to detect fraud. Clearance engine 210 can further apply user preferences to interpret response 165 to release the block on transactions 145. An example algorithm for user profile engine is as follows: wait for user 105 to enter one or more use preferences; apply one or more user preferences to transaction 145; determine whether transaction 145 is fraudulent based on the results of applying the one or more user preferences; upon a determination that transaction 145 is fraudulent, direct the fraud detection engine 205 to apply a block on transaction 145. Another example algorithm for user profile engine is as follows: wait for user 105 to enter one or more user preferences; apply one or more user preferences to message 160. Yet another example algorithm for user profile engine is as follows: wait for user 105 to enter one or more user preferences; apply one or more user preferences to response 165 to determine, based on response 165, whether use of the card to conduct transaction 145 should be permitted; upon a determination that transaction 145 should be permitted, direct the clearance engine 210 to release the block on transaction 145

In some embodiments, fraud remediation tool 125 may further include a global engine. The global engine may communicate across one or more clearance engines 210 of one or more separate fraud remediation tools 125. The global engine may determine the fraud detection engine 205 has applied a block to one or more transactions 145. For example, global engine may determine fraud detection engine 205 has applied a block to a first transaction 145A. In response to a determination that fraud detection engine 205 applied a block to transaction 145A, global engine may direct a second fraud detection engine 205 to apply a second block to a second transaction 145B. Additionally, global engine may, in response to clearance engine 210 releasing a block on transaction 145A, direct a second clearance engine 210 to release a second block on a second transaction 145B. This disclosure contemplates systems where, for example, different payment systems of user 105 are governed by different clearance engines. For example, a first clearance engine may govern credit cards of user 105 and a second clearance engine may govern debit cards of user 105. Global engine allows the release of a block of a first card to further release a block of a second card. An example algorithm for global engine is as follows: wait for fraud detection engine 205 to prevent subsequent use of the card used to conduct transaction 145A; upon a determination that fraud detection engine 205 has prevented subsequent use of the card used to conduct transaction 145A, direct a second fraud detection engine 205 to prevent subsequent use of the card used to conduct transaction 145B. Another example algorithm for global engine is as follows: wait for clearance engine 210 to permit use of the card to conduct transaction 145A; upon a determination that clearance engine 210 has permitted use of the card to conduct transaction 145A, direct the second clearance engine 210 to permit use of the card to conduct transaction 145B.

In some embodiments, fraud detection engine 205 can also determine whether transactions 145 meet other criteria. For example in some embodiments, fraud detection engine 205 may determine if a first transaction 145A and second transaction 145B are within a distance of each other. As an example and not by way of limitation, a distance may be in the form of miles, kilometers, feet, telephone area code, zip code, state, country, or other geographic indicator. If the first transaction 145A and the second transaction 145B are not within a distance of each other, fraud detection engine 205 may release block 155 on only the first card but not the second card.

In some embodiments, fraud detection engine 205 may determine if the first transaction 145A and the second transaction 145B are initiated by the same device 115. This disclosure contemplates device 115 containing one or more cards, such that users 105 can use device 115 to make purchases. Device 115 may be any appropriate device for communicating with components of system 100 over network 120 to facilitate a transaction. For example, device 115 may be a merchant point of sale, a cash register, a telephone, a mobile phone, a computer, a laptop, a tablet and/or an automated assistant. This disclosure contemplates device 115 being any appropriate device for sending and receiving transactions over network 120. As an example and not by way of limitation, device 115 may be a computer, a laptop, a wireless or cellular telephone, an electronic notebook, a digital assistant, a tablet, or any other device capable of receiving, processing, storing, and/or communicating information with other components of system 100. Device may also include user interface such as a display, a microphone, keypad or other appropriate terminal equipment usable by user 105. In some embodiments, an application executed by device 115 may perform the functions described herein. If the first transaction 145A and the second transaction 145B are not initiated by the same device, the fraud detection engine 205 may release the block on the first card but not the second card.

In some embodiments, the fraud detection engine 205 may determine if the first transaction 145A and the second transaction 145B are for the same amount. As an example and not by way of limitation, amount may be in the form of dollars, cents, bitcoins, foreign currency, reward points, gift card balance, or any other form of currency. If the first transaction 145A and the second transaction 145B are not for the same amount, the fraud detection engine 205 may release the block on the first transaction 145A but not the second transaction 145B.

In some embodiments, fraud remediation tool 125 depicted in FIG. 2 provides several technical advantages over conventional fraud detection tools. For example, fraud remediation tool 125 allows users 105 to release holds on multiple blocked cards, whereas conventional fraud detection tools allow a user to release a hold on only one card. As another example, fraud remediation tool 125 improves the operation of the underlying computer hardware of the fraud detection system by removing holds on multiple cards that would otherwise be unremovable in a conventional system. In this manner, the underlying computer hardware is not tasked with storing and processing holds unnecessarily, thereby reducing the computational resources (e.g., processor and memory resources) used by the system.

Modifications, additions or omissions may be made to fraud remediation tool 125 depicted in FIG. 2. Fraud remediation tool 125 may include more, fewer or other components. Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

FIG. 3 is a flowchart illustrating a method 300 for remediating fraud using the system 100 of FIG. 1. In particular embodiments, fraud remediation tool 125 performs method 300. By performing method 300, fraud remediation tool 125 may clear holds on all cards of a user upon a response to a fraud alert message authorizing at least one of the cards. Additionally, fraud remediation tool 125 can release blocks on multiple cards in response to one response to a fraud alert message.

Fraud remediation tool 125 may begin by storing a plurality of fraud detection rules 305. In step 305, fraud remediation tool 125 may retrieve a plurality of fraud detection rules. In step 310, fraud remediation tool 125 may receive a first transaction from a device. Fraud remediation tool 125 may then determine if the transaction is fraudulent in step 315. In step 320, fraud remediation tool 125 may block the transaction. In particular embodiments, fraud remediation tool 125 may determine the transaction is fraudulent by applying fraud detection rules. In step 325, fraud remediation tool 125 may send a message to user 105. In particular embodiments, the message may be a fraud alert message. In step 330, the fraud remediation tool receives a second transaction from a device. The fraud remediation tool 125 determines the transaction is fraudulent in step 335. In step 340, the fraud remediation tool 125 blocks the second transaction. In response to blocking the transaction, fraud remediation tool 125 sends message to user 105 in step 345. In step 350, the fraud remediation tool receives a response from user 105. Finally, in step 355, fraud remediation tool 125 releases the block on the first and second transactions.

Modifications, additions or omissions may be made to method 300 depicted in FIG. 3. Method 300 may include more, fewer or other steps. For example, steps may be performed in parallel or in any suitable order. While discussed as fraud remediation tool 125 or components thereof, performing the steps any suitable component of system 100 may perform one or more steps of the method.

Although the present disclosure includes several embodiments, a myriad of changes, variations, alterations, transformations and modifications may be suggested to one skilled in the art and it is intended that the present disclosure encompass such changes, variations, alterations, transformations and modifications within the scope of the appended claims.

What is claimed is:

1. A system for releasing a hold on a plurality of payment cards of a user, comprising:
 a user mobile device having an interface, the device configured to:
  initiate a first transaction involving a first payment card, wherein the first payment card is a credit card of a user;
  initiate a second transaction involving a second payment card, wherein the second payment card is a debit card of the user, the second transaction occurring after the first transaction if the first transaction is declined; and
  provide, on the user interface, messages associated with the first transaction and the second transaction;
 a fraud remediation server comprising:
  a memory configured to store a plurality of fraud detection rules and user profiles, the user profiles comprising account information associated with the first and second payment cards, the user profiles further comprising user-specified preferences including fraud detection criteria and preferences for handling holds involving the payment cards;
  a network interface configured to communicate electronically with the user mobile device and a point of sale device of a merchant and is also configured to receive from the point of sale device while the user is at the point of sale device:
   the first transaction involving the first payment card; and
   the second transaction involving the second payment card; and
  processing circuitry configured to implement:
   a fraud detection engine configured to:
    determine, based on the plurality of fraud detection rules and the fraud detection criteria, that the first transaction is fraudulent;
    in response to the determination that the first transaction is fraudulent, and pursuant to the user-specified preferences:
    stop the first transaction;
    block use of the first payment card; and
    communicate a first message to the user mobile device indicating that the first payment card is blocked, the user interface is further configured to display the first message to the user indicating that the first payment card is blocked, the first message comprising a first choice between yes and no, the user interface allows interaction by the user to clear the block on the first payment card by selecting yes or no for the first choice;
    determine, based on the plurality of fraud detection rules and the fraud detection criteria, that the second transaction is fraudulent;
    in response to the determination that the second transaction is fraudulent, and pursuant to the user-specified preferences:
    stop the second transaction;
    block use of the second payment card; and
    communicate a second message to the user mobile device indicating that the second payment card is blocked, the user mobile device interface is further configured to display the second message to the user indicating that the second payment card is blocked, the second message comprising a second choice between yes and no, the user interface allows interaction by the user to clear the block on the second payment card by selecting yes or no for the second choice;
   a first clearance engine associated with the first payment card;
   a second clearance engine associated with the second payment card, the second clearance engine configured to:
    receive, from the user mobile device, a response to the second message from the user, the response indicating that the second transaction is not fraudulent and indicating a selection by the user of yes or no for the second choice; and release the block on the second payment card based on the response; and a global engine configured to:
determine that the second clearance engine has released the block on the second payment card;
in response to determining that the block on the second payment card has been released, automatically direct the first clearance engine to release the block on the first payment card even though the user has not responded to the first message; and a network configured to facilitate communication between the user mobile device and the fraud remediation server.

2. The system of claim 1, wherein the block on the first payment card puts the first transaction in a temporary hold state.

3. The system of claim 1, wherein:
the network interface is further configured to receive from the user mobile device:
a third transaction involving a third payment card of the user wherein the third payment card is a credit card of the user; and
a fourth transaction involving a fourth payment card of the user wherein the fourth payment card is a debit card of the user;
the fraud detection engine is further configured to:
determine, based on the plurality of fraud detection rules and the fraud detection criteria, that the third transaction is fraudulent;
in response to the determination that the third transaction is fraudulent, and pursuant to the user-specified preferences:
stop the third transaction; and
block use of the third payment card; and
the global engine further configured to:
determine that the fraud detection engine has blocked use of the third payment card; and
in response to the determination that the fraud detection engine has blocked use of the third payment card, direct the fraud detection engine to block use of the fourth payment card.

4. The system of claim 1, wherein:
the network interface is further configured to receive from the user mobile device:
a third transaction involving a third payment card of the user wherein the third payment card is a credit card of the user; and
a fourth transaction involving a fourth payment card of the user wherein the fourth payment card is a debit card of the user;
the fraud detection engine is further configured to:
determine, based on the plurality of fraud detection rules and the fraud detection criteria, that the third transaction is fraudulent;
in response to the determination that the third transaction is fraudulent, and pursuant to the user-specified preferences:
stop the third transaction;
block use of the third payment card; and
communicate a third message to the user indicating that the third payment card is blocked, the user interface is further configured to display the third message to the user indicating that the third payment card is blocked, the third message comprising a third choice between yes and no, the user interface allows interaction by the user to select yes or no for the third choice;
determine, based on the plurality of fraud detection rules and the fraud detection criteria, that the fourth transaction is fraudulent;
in response to the determination that the fourth transaction is fraudulent, and pursuant to the user-specified preferences:
stop the fourth transaction; and
block use of the fourth payment card;
the fraud remediation server further comprising a third clearance engine and a fourth clearance engine, the third clearance engine further configured to:
receive, from the user mobile device, a response to the third message from the user, the response indicating that the third transaction is not fraudulent and indicating a selection by the user of yes or no for the third choice; and
based on the response to the third message release the block on the third payment card; and
the global engine further configured to:
determine that the third clearance engine has released the block on the third payment card; and
in response to the determination that the third clearance engine has released the block on the third payment card, direct the fourth clearance engine to release the block on the fourth payment card.

5. The fraud remediation server of claim 1, wherein the fraud detection engine is further configured to:
determine whether the first transaction was initiated within a distance of a location set by the user; and
in response to a determination that the first transaction was not initiated within the distance of the location, determine that the first transaction is fraudulent.

6. The fraud remediation server of claim 1, wherein the fraud detection engine is further configured to:
determine whether the first transaction exceeds an amount set by the user; and
in response to a determination that the first transaction exceeds the amount set by the user, determine that the first transaction is fraudulent.

7. The fraud remediation server of claim 1, wherein the fraud detection engine is further configured to:
determine whether the second transaction exceeds a number of repetitive purchases for the same amount at a location, wherein the number of repetitive purchases is set by the user; and
in response to a determination that the second transaction exceeds the number of repetitive purchases for the same amount at the location, determine that the second transaction is fraudulent.

8. A method comprising:
initiating a first transaction involving a first payment card, wherein the first payment card is a credit card of a user;
initiating a second transaction involving a second payment card, wherein the second payment card is a debit card of the user, the second transaction occurring after the first transaction if the first transaction is declined; and
providing, on a user interface, messages associated with the first transaction and the second transaction;
storing a plurality of fraud detection rules and user profiles, the user profiles comprising account information associated with the first and second payment cards, the user profiles further comprising user-specified preferences including fraud detection criteria and preferences for handling holds involving the payment cards;

receiving, from a point of sale device of a merchant while the user is at the point of sale device, the first transaction involving the first payment card;

receiving, from the point of sale device, the second transaction involving the second payment card;

determining, based on the plurality of fraud detection rules and fraud detection criteria, that the first transaction is fraudulent;

in response to the determination that the first transaction is fraudulent, and pursuant to the user specified preferences:
   stopping the first transaction,
   blocking use of the first payment card, and
   communicating a first message to the user mobile device indicating that the first payment card is blocked, the user interface is further configured to display the first message indicating that the first payment card is blocked, the first message comprising a first choice between yes and no, the user interface allowing interaction by the user to clear the block on the first payment card by selecting yes or no for the first choice;

determining, based on the plurality of fraud detection rules and fraud detection criteria, that the second transaction is fraudulent; and in response to the determination that the second transaction is fraudulent, and pursuant to the user-specified preferences:
   stopping the second transaction,
   blocking use of the second payment card, and
   communicating a second message to the user mobile device indicating the second payment card is blocked, the user interface is further configured to display the second message to the user indicating that the second payment card is blocked, the second message comprising a second choice between yes and no, the user interface allows interaction by the user to clear the block on the second payment card by selecting yes or no for the second choice;

receiving, from the user mobile device, a response to the second message, the response indicating that the second transaction is not fraudulent and indicating a selection by the user of yes or no for the second choice; and based on the response, releasing the block on the second payment card;

determining that a second clearance engine associated with the second payment card has released the block on the second payment card; and in response to determining that the block on the second payment card has been released, automatically directing a first clearance engine associated with the first payment card to release the block on the first payment card even though the user has not responded to the first message.

9. The method of claim 8, wherein blocking use of the first payment card comprises putting the first transaction in a temporary hold state.

10. The method of claim 8, further comprising:
receiving a third transaction involving a third payment card of the user, wherein the third payment card is a credit card of the user;
receiving a fourth transaction involving a fourth payment card of the user, wherein the fourth payment card is a debit card of the user;
determining, based on the plurality of fraud detection rules and the fraud detection criteria, that the third transaction is fraudulent;
in response to the determination that the third transaction is fraudulent and pursuant to the user-specified preferences:
   stopping the third transaction; and
   blocking use of the third payment card;
determining that use of the third payment card has been blocked; and
in response to the determining that the use of the third payment card has been blocked, directing that use of the fourth payment card be blocked.

11. The method of claim 8, further comprising:
receiving, from the user mobile device, a third transaction involving a third payment card of the user, wherein the third payment card is a credit card of the user;
receiving, from the user mobile device, a fourth transaction involving a fourth payment card of the user, wherein the fourth payment card is a debit card of the user;
determining, based on the plurality of fraud detection rules and the fraud detection criteria, that the third transaction is fraudulent;
in response to the determination that the third transaction is fraudulent and pursuant to the user-specified preferences;
   stopping the third transaction;
   blocking use of the third payment card; and
   communicating a third message to the user indicating that the third payment card is blocked, the user interface is further configured to display the third message indicating that the third payment card is blocked, the third message comprising a third choice between yes and no, the user interface allows interaction by the user to select yes or no for the third choice;
determining, based on the plurality of fraud detection rules and the fraud detection criteria, that the fourth transaction is fraudulent;
in response to the determination that the fourth transaction is fraudulent:
   stopping the fourth transaction, and
   blocking use of the fourth payment card;
   receiving, from the user mobile device, a response to the third message, the response indicating that the third transaction is not fraudulent and indicating a selection by the user of yes or no for the third choice;
based on the response to the third message, releasing the block on the third payment card;
determining that the block on the third payment card has been released; and
in response to the determination that the block on the third payment card has been released, directing that the block on the fourth payment card be released.

12. The method of claim 8, further comprising:
determining whether the first transaction was initiated within a distance of a location set by the user; and
in response to a determination that the first transaction was not initiated within the distance of the location, determining that the first transaction is fraudulent.

13. The method of claim 8, further comprising:
determining whether the first transaction exceeds an amount set by the user; and
in response to a determination that the first transaction exceeds the amount set by the user, determining that the first transaction is fraudulent.

14. The method of claim 8, further comprising:
determining whether the second transaction exceeds a number of repetitive purchases for the same amount at a location, wherein the number of repetitive purchases is set by the user, and
in response to a determination that the second transaction exceeds the number of repetitive purchases for the same amount at the location, determining that the transaction is fraudulent.

15. A system comprising:
a user mobile device configured to:
   initiate a first transaction involving a first payment card of a user, wherein the first payment card is a credit card of a user;
   initiate a second transaction involving a second payment card of a user, wherein the second payment card is a debit card of the user, the second transaction occurring after the first transaction if the first transaction is declined; and
   provide, on a user interface, messages associated with the first transaction and the second transaction;
a fraud remediation server comprising:
   a memory configured to store a plurality of fraud detection rules and user profiles, the user profiles comprising account information associated with the first and second payment cards, the user profiles further comprising user-specified preferences including fraud detection criteria and preferences for handling holds involving the payment cards;
   a network interface configured to communicate electronically with the user mobile device and a point of sale device of a merchant and is also configured to receive from the point of sale device while the user is at the point of sale device:
      the first transaction involving the first payment card; and
      the second transaction involving the second payment card;
   processing circuitry configured to implement:
      a fraud detection engine configured to:
         determine, based on the plurality of fraud detection rules and the fraud detection criteria, that the first transaction is fraudulent;
         in response to the determination that the first transaction is fraudulent, and pursuant to the user-specified preferences:
            stop the first transaction;
            block use of the first payment card; and
            communicate a first message to the user mobile device indicating that the first payment card is blocked, the user interface is further configured to display the first message indicating that the first payment card is blocked, the first message comprising a first choice between yes and no, the user interface allows interaction by the user to clear the block on the first payment card by selecting yes or no for the first choice;
         determine, based on the plurality of fraud detection rules and the fraud detection criteria, that the second transaction is fraudulent;
         in response to the determination that the second transaction is fraudulent, and pursuant to the user-specified preferences:
            stop the second transaction;
            block use of the second payment card; and
            communicate a second message to the user mobile device indicating that the second payment card is blocked, the user mobile device interface is further configured to display the second message indicating that the second payment card is blocked, the second message comprising a second choice between yes and no, the user interface allows interaction by the user to clear the block on the second payment card by selecting yes or no for the second choice;
      a first clearance engine associated with the first payment card;
      a second clearance engine associated with the second payment card, the second clearance engine configured to:
         receive, from the user mobile device, a response to the second message, the response indicating that the second transaction is not fraudulent and indicating a selection by the user of yes or no for the second choice; and
         release the block on the second payment card based on the response; and
      a global engine configured to:
         determine that the second clearance engine has released the block on the second payment card; and
         in response to determining that the block on the second payment card has been released, automatically direct the first clearance engine to release the block on the first payment card even though the user has not responded to the first message.

16. The system of claim 15, wherein the block on the first payment card puts the first transaction in a temporary hold state.

17. The system of claim 15, wherein the network interface is further configured to receive from the user mobile device:
a third transaction involving a third payment card of the user, wherein the third payment card is a credit card of the user; and
a fourth transaction involving a fourth payment card of the user, wherein the fourth payment card is a debit card of the user;
the fraud detection engine is further configured to:
determine, based on the plurality of fraud detection rules and the fraud detection criteria, that the third transaction is fraudulent;
in response to the determination that the third transaction is fraudulent, and pursuant to the user-specified preferences:
   stop the third transaction; and
   block use of the third payment card;
the fraud remediation server further comprising a third clearance engine and a fourth clearance engine; and
the fraud remediation server further comprising a global engine configured to:
   determine if the fraud detection engine has blocked use of the third payment card; and
   in response to the determination that the fraud detection engine has blocked use of the third payment card, direct the fraud detection engine to block use of the fourth payment card.

18. The system of claim 15, wherein:
the network interface is further configured to receive from the user mobile device:
a third transaction involving a third payment card of the user wherein the third payment card is a credit card of the user; and a fourth transaction involving a fourth payment card of the user wherein the fourth payment card is a debit card of the user;

the fraud detection engine is further configured to:
- determine, based on the plurality of fraud detection rules and the fraud detection criteria, that the third transaction is fraudulent;
- in response to the determination that the third transaction is fraudulent, and pursuant to the user-specified preferences:
  - stop the third transaction;
  - block use of the third payment card; and
  - communicate a third message to the user indicating that the third payment card is blocked, the user interface is further configured to display the third message indicating that the third payment card is blocked, the third message comprising a third choice between yes and no, the user interface allows interaction by the user to select yes or no for the third choice;
- determine, based on the plurality of fraud detection rules and the fraud detection criteria, that the fourth transaction is fraudulent;
- in response to the determination that the fourth transaction is fraudulent, and pursuant to the user-specified preferences:
  - stop the fourth transaction; and
  - block use of the fourth payment card;

the fraud remediation server further comprising a third clearance engine and a fourth clearance engine, the third clearance engine further configured to:
- receive, from the user mobile device, a response to the third message, the response indicating that the third transaction is not fraudulent and indicating a selection by the user of yes or no for the third choice; and
- based on the response to the third message, release the block on the third payment card; and the fraud remediation server further comprising a global engine configured to:
- determine that the third clearance engine has released the block on the third payment card; and
- in response to the determination that the third clearance engine has released the block on the third payment card, direct the fourth clearance engine to release the block on the fourth payment card.

19. The system of claim 15, wherein the fraud detection engine is further configured to:
- determine whether the first transaction was initiated within a distance of a location set by the user; and
- in response to a determination that the first transaction was not initiated within the distance of the location, determine that the first transaction is fraudulent.

20. The system of claim 15, wherein the fraud detection engine is further configured to:
- determine whether the first transaction exceeds an amount set by the user; and
- in response to a determination that the first transaction exceeds the amount set by the user, determine that the first transaction is fraudulent.

21. The system of claim 15, wherein the fraud detection engine is further configured to:
- determine whether the second transaction exceeds a number of repetitive purchases for the same amount at a same location, wherein the number of repetitive purchases is set by the user; and
- in response to a determination that the second transaction exceeds the number of repetitive purchases for the same amount at the same location, determine that the transaction is fraudulent.

* * * * *